United States Patent [19]

Lombardino

[11] 3,891,637
[45] June 24, 1975

[54] PROCESS FOR THE PRODUCTION OF CARBOXAMIDES OF OXO-1,2-BENZOTHIAZINE-1,1-DIOXIDES

[75] Inventor: Joseph G. Lombardino, Niantic, Conn.

[73] Assignee: Pfizer Inc., New York, N.Y.

[22] Filed: Oct. 1, 1974

[21] Appl. No.: 510,892

[52] U.S. Cl. ............................ 260/243 R; 424/246
[51] Int. Cl. ............................................ C07d 93/02
[58] Field of Search ................................ 260/243 R

[56] References Cited
UNITED STATES PATENTS 3,646,020  2/1972  Zinnes et al. .................... 260/243
3,853,862  12/1974  Lombardino .................... 260/243

Primary Examiner—John M. Ford
Attorney, Agent, or Firm—Connolly and Hutz

[57] ABSTRACT

Disclosed herein is an improved process for the production of carboxamides of 3,4-dihydro-oxo-1,2-benzothiazine-1,1-dioxides. Said process comprises contacting either a 3-oxo- or 4-oxo-1,2-benzothiazine-1,1-dioxide with a known or readily prepared phenylisocyanate to produce the corresponding 4- or 3-carboxanilide followed by a transamidation with an amine whose own isocyanate is frequently unstable to produce carboxamide with previously disclosed pharmaceutical value as a non-steroidal anti-inflammatory agent.

10 Claims, No Drawings

PROCESS FOR THE PRODUCTION OF CARBOXAMIDES OF OXO-1,2-BENZOTHIAZINE-1,1-DIOXIDES

BACKGROUND OF THE INVENTION

1. Field of the Invention

This invention relates to a process for the production of carboxamides of benzothiazine dioxides which have been found to be valuable anti-innflammatory agents that do not produce the undesirable side-effects frequently experienced with corticosteroids, such compounds are described in my commonly assigned U.S. Pat. No. 3,591,584, issued July 6, 1971, the disclosure of which is incorporated herein by reference. In particular, it relates to an improved chemical process for the production of N-substituted-3,4-dihydro-2-substituted-4-oxo-2H-1,2-benzothiazine-3-carboxamide-1,1-dioxides and N-substituted-3,4-dihydro-2-substituted-3-oxo-2H-1,2-benzothiazine-4-carboxamide-1,1-dioxide wherein the N-substituent is a heterocyclic moiety.

2. Description of the Prior Art

As disclosed in U.S. Pat. No. 3,591,584, two routes are available for the synthesis of N-substituted-benzothiazine-carboxamides. The first, used wherein the moiety is not a heterocycle, comprises contacting a compound of the general formula

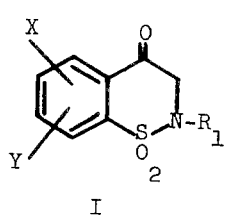
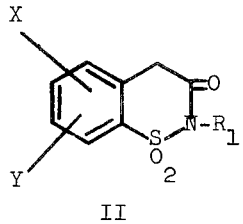

I    II wherein X and Y are each a member selected from the group consisting of hydrogen, fluorine, chlorine, bromine, nitro, alkyl and alkoxy having up to five carbon atoms and trifluoro methyl, and $R_1$ is selected from the group consisting of hydrogen, lower alkyl, alkenyl having up to four carbon atoms and phenylalkyl having up to three carbon atoms in the alkyl moiety, with an organic isocyanate of the formula $R_3NCO$ wherein $R_3$ is selected from the group consisting of hydrogen, alkyl having one to eight carbon atoms, phenylalkyl having up to three carbon atoms in the alkyl moiety phenyl, substituted phenyl and naphthyl to produce a compound of the general structural formula

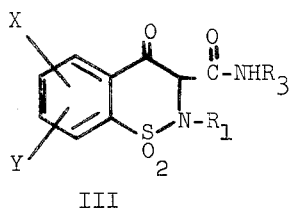

III or

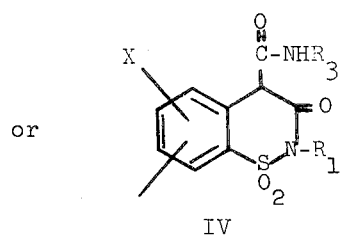

IV

The second method was employed in the preparation of those compounds wherein the N-substituent is a heterocyclic moiety such as substituted or unsubstituted pyridyl, pyrimidyl, pyrazinyl, pyridazinyl, pyrazolonyl, thiazolyl, isothiazolyl, benzothiazolyl, benzoxazolyl or thiadiazolyl. The isocyanate route was not used to prepare these compounds because the requisite heterocyclic isocyanates are either unstable or extremely difficult to synthesize. The 4-carboxamides were instead prepared from compounds of Formula III or IV wherein $R_3$ is a mono-, di- or unsubstituted phenyl and the substituents are chosen from the group consisting of fluorine, chlorine, bromine, nitro, trifluoromethyl and alkyl and alkoxy having from one to three carbon atoms. Said compounds were contacted with an alcohol to form the corresponding 3- or 4-carboxylic acid ester by the alcoholysis method well-known to those skilled in the art. The 3-carboxamides were prepared from known compounds such as a 3-oxo-1,2-benzothiazoline-2-acetic acid ester, [Chemische Berichte, vol. 30, p. 1267 (1897).] Said benzothiazoline were treated with an alkali metal alkoxide like sodium methoxide in a polar solvent such as dimethylsulfoxide or dimethylformamide whereby they rearrange to the corresponding 3,4-dihydro-4-oxo-2H-1,2-benzothiazine-3-carboxylate-1,1-dioxide ester. [Journal of Organic Chemistry, vol. 30, p. 2241 (1965).] This compound is then treated with an alkyl halide, preferably an iodide, wherein the alkyl group is identical with $R_1$ to yield the desired ester. Said 3- and 4-esters were then contacted with at least an equimolar amount of an amine of the general formula $R_2NH_2$ wherein $R_2$ is one of the heterocyclic moieties of interest to produce the desired benzothiazine carboxamide which is N-substituted with a heterocyclic moiety. Standard ammonolysis procedures known to those skilled in the art of organic chemistry were employed.

SUMMARY OF THE INVENTION

The process of this invention for producing a 3,4-dihydro-2H-1,2-benzothiazine-1,1-dioxide of the formula

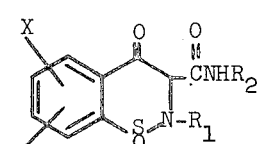

V or

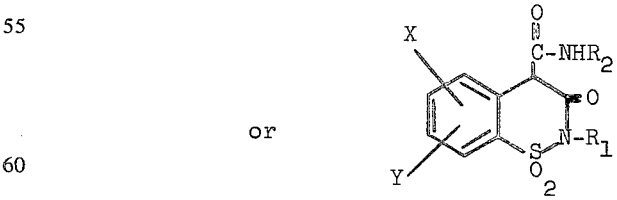

VI wherein X and Y are each a member selected from the group consisting of hydrogen, fluorine, chlorine, bromine, nitro, trifluoromethyl and alkyl and alkoxy each having from one to five carbon atoms; $R_1$ is a member selected from the group consisting of hydrogen, alkyl having from one to six carbon atoms, alkenyl having up to four carbon atoms, and phenylalkyl having up to three carbon atoms in the alkyl moiety;

and $R_2$ is a member selected from the group consisting of 2-pyridyl, 3-methyl-2-pyridyl, 4-methyl-2-pyridyl, 5-methyl-2-pyridyl, 6-methyl-2-pyridyl, 4,6-dimethyl-2-pyridyl, 5-chloro-2-pyridyl, 5-bromo-2-pyridyl, 5-nitro-2-pyridyl, 3-hydroxy-2-pyridyl, 5-carboxamido-2-pyridyl, 2-pyrazinyl, 2-pyrimidyl, 4,5-dimethyl-2-pyrimidyl, 4-pyrimidyl, 5-methyl-3-pyrazinyl, 6-methoxy-3-pyridazinyl, 1-phenyl-3-pyrazolonyl, 2-thiazolyl, 4-methyl-2-thiazolyl, 4-phenyl-2-thiazolyl, 5-bromo-2-thiazolyl, 4,5-dimethyl-2-thiazolyl, 3-isothiazolyl, 2-benzothiazolyl, 6-methyl-2-benzothiazolyl, 4-chloro-2-benzothiazolyl, 6-bromo-2-benzothiazolyl, 5-chloro-2-benzoxazolyl, 1,3,4-thiadiazolyl, 5-methyl-1,2,4-thiadiazolyl, 5-methyl-1,3,4-thiadiazolyl, 1,2,4-triazolyl and 6-phenyl-1,2,4-triazolyl comprises:

contacting a carboxanilide of the general structural formula

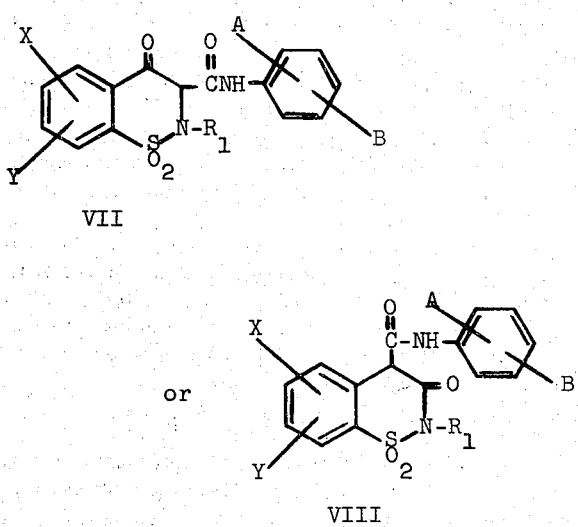

VII or

VIII wherein A and B are each selected from the group consisting of hydrogen, fluorine, chlorine, bromine, nitro, trifluoromethyl and alkyl and alkoxy each having from one to three carbon atoms and X, Y and $R_1$ are all as previously defined;

with an amine of the formula $R_2NH_2$ wherein $R_2$ is also as previously defined in a reaction-inert medium at a temperature between about 75° and 200°C. to produce either a 3,4-dihydro-2-substituted-4-oxo-N-acyl-2H-1,2-benzothiazine-3-carboxamide-1,1-dioxide or 3,4-dihydro-2-substituted-3-oxo-N-acyl-2H-1,2-benzothiazine-4-carboxamide-1,1-dioxide wherein the acyl moiety is a heterocycle as defined above.

The preferred products of the process of this invention are the 3-carboxamides especially those wherein $R_2$ is 2-thiazolyl or 2-pyridyl. Other preferred products are those 3-carboxamides wherein X and Y are each hydrogen and $R_1$ is methyl. Preferred starting materials are those of Formula VII wherein either of said A or B is other than hydrogen and located at the ortho position. Preferred substituents are chloro and methoxy.

Especially preferred as a starting material is the compound of Formula VII wherein $R_1$ is methyl, A is 2-chloro and B is 5-chloro.

The process of the instant invention is superior to the prior art in that it substitutes a transamidation for an alcoholoysis followed by an ammonolysis. Thus, compounds of Formulae VII and VIII can be converted in a single step to those of Formulae V and VI respectively. The need for the preparation of the 3- or 4-carboxylic acid ester in an intermediate step is thereby obviated. The products of the process of the instant invention are valuable as non-steroidal anti-inflammatory agents.

DETAILED DESCRIPTION OF THE INVENTION

In the preferred embodiment, a carboxanilide of Formula VII or VIII is dissolved in a reaction-inert solvent at a concentration of at least 0.5% by weight. Reaction-inert solvents are those which are substantially free of adverse effects on reactants and products under the reaction condition employed. An example of such solvents are the xylenes. To this reaction mixture is added at least one equivalent of a heterocyclic amine of the formula $R_2NH_2$. Preferably, at least two equivalents of said amine are employed. Said mixture is then refluxed under nitrogen until the reaction is substantially complete. This process usually requires about two days, said reaction mixture is then evaporated in vacuo to yield a gum-like solid residue, said residue is then dissolved in a minimum amount of boiling isopropanol or other suitable solvents for recrystallization well known to those skilled in the art. The solution is then cooled to about 0°C. and maintained there as a precipitate forms. The precipitate is then filtered and air dried.

The carboxanilides of Formula VII or VIII are prepared by contacting a phenylisocyanate bearing said A and B substituents with a benzothiazine of the Formula I or II respectively. This particular reaction is normally carried out in a basic solvent medium, most desirably employing a reaction-inert organic solvent such as tetrahydrofuran, dimethylsulfoxide or dimethylformamide and preferably using a slight molar excess of a base such as triethylamine, which may be admixed with the solvent. Many of the aforesaid isocyanate reagents are either known compounds or else they can easily be prepared, using methods well-known to those skilled in the art, starting from readily available materials. In practice, it is usually preferable to employ at least about a molar equivalent of the isocyanate reagent in the instant reaction of the present invention, with best results often being achieved by using just a slight excess of same. Although any temperature below that of reflux may be used in order to effect the reaction, it is normally found most convenient to employ elevated temperatures in almost every case, so as to shorten the required reaction time, which may range anywhere from several minutes up to about 24 hours depending, of course, upon the particular carboxamide compound actually being prepared. Upon completion of the reaction, the product is easily recovered from the spent mixture by pouring same into an excess of icewater containing a slight excess of acid, such as hydrochloric acid, whereby the carboxamide compound rapidly precipitates from solution and is subsequently collected by such means as suction filtration and the like.

The preparation of compounds of Formula I through the sodium alkoxide isomerization of saccharin derivatives has been discussed in detail in H. Zinnes et al., *Journal of Organic Chemistry*, 31, 162 (1966). The 3-oxo compounds of Formula II are prepared using o-toluene sulfonamide as a starting material. For example, the compound wherein $R_1$ is methyl is prepared by reacting N-methyl o-toluene sulfonamide with n-butyl lithium followed by aqueous mineral acid to afford 2-(N-methylsulfamyl) phenylacetic acid which is then treated with p-toluenesulfonic acid to produce 3,4-dihydro-2-methyl-3-oxo-2H-1,2-benzothiazine-1,1-dioxide.

EXAMPLE I 3,4-Dihydro-2-Methyl-4-Oxo-2H-1,2-Benzothiazine-3Carboxanilide-1,1-Dioxide In a round-bottomed three-necked flask fitted with reflux condenser, magnetic stirrer, dropping funnel and gas-inlet tube, there were placed 0.082 g. (0.0017 mole) of a 50% dispersion of sodium hydride in a mineral oil, said dispersion having been washed in n-hexane and the residue, after decantation, suspended in 3 ml. of dry dimethylformamide while under a dry nitrogen atmosphere. Stirring was then commenced and to the resulting gray suspension, there were then added dropwise a combination consisting of 0.316 g. (0.0015 mole) of 3,4-dihydro-2-methyl-4-oxo-2H-1,2-benzothiazine 1,1-dioxide [H. Zinnes et al., *J. Org. Chem.*, Vol. 31, p. 162 (1966)] and 0.178 g. (0.0015 mole) of phenyl isocyanate dissolved in 3 ml. of dry dimethylformamide. Foaming and gas evolution occurred during the addition step and when the latter was complete, the reaction mixture was stirred at room temperature (~25°C.) for a period of 15 minutes and then poured into 15 ml. of cold 3 N hydrochloric acid. The resulting pale yellow precipitate was filtered and then vacuum dried to afford 302 mg. of material melting at 205°–215°C. After one recrystallization from isopropanol, there was obtained 208 mg. (42%) of 3,4-dihydro-2-methyl-4-oxo-2H-1,2-benzothiazine-3-carboxanilide 1,1-dioxide, M.P. 213°–215°C.

Analysis.—Calcd. for $C_{16}H_{14}N_2OS$ (percent): C,58.17; H,4.27; N,8.48. Found (percent): C,58.14; H,4.33; N,8.14.

EXAMPLE II

2′,5′-Dichloro-3,4-Dihydro-2-Methyl-4-Oxo-2H-1,2-Benzothiazine-3-Carboxanilide-1,1-Dioxide The procedure described in Example I was repeated using 0.576 g. (0.012 mole) of 50% sodium hydride-oil (hexane-washed) in 15 ml. of dry dimethylformamide, 2.53 g. (0.012 mole) of 3,4-dihydro-2-methyl-4-oxo-2H-1,2-benzothiazine 1,1-dioxide and 2.26 g. (0.012 mole) of 2,5-dichlorophenyl isocyanate in 20 ml. of dry dimethylformamide. Upon completion of the reaction, the resulting mixture was poured into 140 ml. of iced 3 N hydrochloric acid and filtered. The heavy yellow precipitate collected in this manner was then air dried and subsequently dissolved in boiling ethanol, from which pale yellow crystals of 2′,5′-dichloro-3,4-dihydro-2-methyl-4-oxo-2H-1,2-benzothiazine-3-carboxanilide 1,1-dioxide (M.P. 223°–225°C.) soon deposited on slow cooling. The yield of product amounted to 678 mg. (14%).

Analysis.—Calcd. for $C_{16}H_{12}Cl_2N_2O_4S$ (percent): C,48.13; H,3.03; N,7.02. Found (percent): C,48.09; H,3.10; N,6.95.

EXAMPLE III

Substituted-3,4-Dihydro-2-Methyl-4-Oxo-2H-1,2-Benzothiazine-3-Carboxanilide-1,1-Dioxides The procedure described in Example I was repeated to prepare the following 3,4-dihydro-2-methyl-4-oxo-2H-1,2-benzothiazine-3-carboxamide 1,1-dioxides, starting from 3,4-dihydro-2-methyl-4-oxo-2H-1,2-benzothiazine 1,1-dioxide and the appropriate organic isocyanate reagent in each case:

4′-chloro-3,4-dihydro-2-methyl-4-oxo-2H-1,2-benzothiazine-3-carboxanilide 1,1-dioxide, M.P. 230°–232°C.

2′-methoxy-3,4-dihydro-2-methyl-4-oxo-2H-1,2-benzothiazine-3-carboxanilide, 1,1-dioxide, M.P. 178°–180°C.

4′-methoxy-3,4-dihydro-2-methyl-4-oxo-2H-1,2-benzothiazine-3-carboxanilide 1,1-dioxide, M.P. 250°–252°C.

2′-methyl-3,4-dihydro-2-methyl-4-oxo-2H-1,2-benzothiazine-3-carboxanilide 1,1-dioxide, M.P. 157°–160°C.

4′-methyl-3,4-dihydro-2-methyl-4-oxo-2H-1,2-benzothiazine-3-carboxanilide 1,1-dioxide, M.P. 234°–236°C.

3′-trifluoromethyl-3,4-dihydro-2-methyl-4-oxo-2H-1,2-benzothiazine-3-carboxanilide 1,1-dioxide, M.P. 195°–198°C.

3′-chloro-3,4-dihydro-2-methyl-4-oxo-2H-1,2-benzothiazine-3-carboxanilide 1,1-dioxide, M.P. 267°–269°C. (dec.)

3′,4′-dichloro-3,4-dihydro-2-methyl-4-oxo-2H-1,2-benzothiazine-3-carboxanilide 1,1-dioxide, M.P. 279°–281°C.

2′-chloro-3,4-dihydro-2-methyl-4-oxo-2H-1,2-benzothiazine-3-carboxanilide 1,1-dioxide, M.P. 197°–199°C.

4′-nitro-3,4-dihydro-2-methyl-4-oxo-2H-1,2-benzothiazine-3-carboxanilide 1,1-dioxide, M.P. 233°–236°C.

4′-bromo-3,4-dihydro-2-methyl-4-oxo-2H-1,,2-benzothiazine-3-carboxanilide 1,1-dioxide, M.P. 233°–236°C.

3′-methyl-3,4-dihydro-2-methyl-4-oxo-2H-1,2-benzothiazine-3-carboxanilide 1,1-dioxide, M.P. 219°–222°C.

4′-ethoxy-3,4-dihydro-2-methyl-4-oxo-2H-1,2-benzothiazine-3-carboxanilide 1,1-dioxide, M.P. 258°–260°C.

4′-fluoro-3,4-dihydro-2-methyl-4-oxo-2H-1,2-benzothiazine-3-carboxanilide-1,1-dioxide M.P. 238°–240°C.

EXAMPLE IV

Substituted-3,4-Dihydro-2-Methyl-4-Oxo-2H-1,2-Benzothiazine-3-Carboxanilide-1,1-Dioxides The procedure described in Example I is employed to prepare the following 3-carboxamide compounds starting from the corresponding 3,4-dihydro-4-oxo-2H-1,2-benzothiazine 1,1-dioxide and the appropriate organic isocyanate or isothiocyanate reagent in each case:

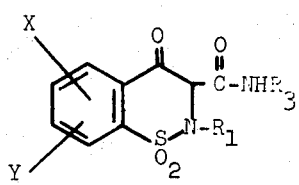

| X | Y | R₃ | R₁ |
|---|---|---|---|
| 5—CH₃ | H | phenyl | C₆H₅(CH₂)₂ |
| 6—OCH₃ | H | o-nitrophenyl | iso—C₃H₇ |
| H | 8—Cl | m-nitrophenyl | C₂H₅ |
| 5—Cl | H | p-nitrophenyl | methallyl |
| H | 7—OCH₃ | 2-chlorophenyl | iso—C₅H₁₁ |
| 6—Cl | 7—Cl | 3-chlorophenyl | n—C₃H₇ |
| 5—Br | H | 4-chlorophenyl | C₆H₅CH₂ |
| 5—(n—C₄H₉) | H | 2-methylphenyl | methallyl |
| 6—OC₂H₅ | H | 3-methylphenyl | iso—C₃H₇ |
| H | 8—Br | 4-methylphenyl | C₆H₅(CH₂)₂ |
| 6—Cl | H | 2-methoxyphenyl | C₂H₅ |
| 6—Br | H | 4-methoxyphenyl | allyl |
| 6—CH₃ | 7—CH₃ | 2,5-dichlorophenyl | n—C₄H₉ |
| 6—OCH₃ | 7—OCH₃ | 3,4-dimethylphenyl | C₆H₅CH₂ |
| H | H | 3,4-dichlorophenyl | iso—C₄H |
| H | 8—Cl | 4-(n-butyl)phenyl | CH₃ |
| H | H | 3-CF₃ phenyl | methallyl |
| 5—CH₃ | H | 2,4-dimethoxyphenyl | C₂H₅ |
| H | 8—(n—C₄H₉) | 2,5-dimethoxyphenyl | C₆H₅CH₂ |
| H | H | 2-ethoxyphenyl | iso—C₃H₇ |
| 6—OC₅H₁₁(n) | 7—OC₅H₁₁(n) | 4-ethoxyphenyl | allyl |
| H | H | 3-isopropoxyphenyl | CH₃ |
| 6—F | 7—F | 4-bromophenyl | C₆H₅(CH₂)₂ |
| H | H | 4-fluorophenyl | n—C₃H₇ |
| 6—CF₃ | 7—CF₃ | 2,3-dichlorophenyl | C₆H₅CH₂ |
| 6—Cl | H | 5-Cl-2-methoxyphenyl | C₂H₅ |
| 6—Br | 7—Br | 3,5-dichlorophenyl | iso—C₄H₉ |
| 5—CH₃ | H | 3,5-dimethoxyphenyl | C₆H₅CH₂ |
| H | 7—OC₅H₁₁ | 2,6-dimethylphenyl | methallyl |
| 6—(n—C₅H₁₁) | 7—(in-C₅H₁₁) | 2-CH₃O-5-methylphenyl | CH₃ |
| H | 8—NO₂ | 2,4-dimethylphenyl | iso—C₄H₉ |
| H | H | 3-Cl-4-methylphenyl | C₆H₅(CH₂)₂ |
| 5—OCH₃ | H | 2-Cl-5-CF₃ phenyl | C₂H₅ |

EXAMPLE V 3,4-Dihydro-2-Methyl-3-Oxo-2H-1,2-Benzothiazine-1,1-Dioxide

In a round-bottomed flask (equipped with magnetic stirrer) under a dry nitrogen atmosphere, there were placed 31.4 g. (0.17 mole) of N-methyl o-toluenesulfonamide dissolved in 600 ml. of dry tetrahydrofuran. This solution was cooled to 0°C., at which point 219 ml. of n-butyl lithium (1.6 M) in n-hexane (0.35 mole) were added dropwise in a rapid manner. After the addition was complete, the reaction mixture was stirred at room temperature (~25°C.) for 15 minutes and then poured slowly into a heavy slurry of approximately 1500 ml. of dry ice in diethyl ether, which was also kept under a nitrogen atmosphere. The resulting suspension was then stirred at room temperature for seventy minutes, at which point 500 ml. of water were added and the aqueous mixture thus obtained was subsequently acidified with 700 ml. of concentrated hydrochloric acid. The so-acidified aqueous solution was then concentrated in vacuo to one-third of its original volume and a white solid precipitate soon deposited from the concentrate on cooling to room temperature. The latter solid material was subsequently collected by means of suction filtration and air dried to constant weight to afford 29.1 g. (75%) of 2-(N-methylsulfamyl)phenylacetic acid, M.P. 158°–164°C.

To a solution of 29.0 g. (0.13 mole) of the above acid in 1500 ml. of dry benzene, there were added approximately 100 mg. of p-toluenesulfonic acid. The entire system was contained in a round-bottomed flask, equipped with reflux condenser, Dean Stark trap and a drying tube. The solution was then heated to the boiling point and refluxed for 2 hours thereafterwards, at which point 3.0 ml. of water had separated (i.e., was removed from the reaction mixture). After filtering the hot solution to remove any physical impurities, the resulting filtrate was concentrated in vacuo to near dryness to afford a yellow-brown oil which subsequently crystallized on cooling to a yellow solid. The latter material (29.3 g.) was then recrystallized from isopropanol-water and there was obtained in this matter 22 g. (61%) of 3,4-dihydro-2-methyl-3-oxo-2H-1,2-benzothiazine 1,1-dioxide, M.P. 89°–91°C.

Analysis.—Calcd. for C₉H₉NO₃S (percent): C,51.17; H,4.29; N,6.63. Found (percent): C,51.42; H,4.68; N,6.62.

EXAMPLE VI

2'-Chloro-3,4-Dihydro-2-Methyl-3-Oxo-2H-1,2-Benzothiazine-4-Carboxanilide-1,1-Dioxide The procedure described in Example I was followed except that 3.09 g. (0.0143 mole) of 3,4-dihydro-2-methyl-3-oxo-2-H-1,2-benzothiazine 1,1-dioxide in 20 ml. of dimethylsulfoxide was reacted with 2.2 g. (0.0143 mole) of o-chlorophenyl isocyanate in the presence of 1.45 g. (0.0143 mole) of triethylamine (in place of 50% sodium hydride). The resulting mixture was flushed with nitrogen and then stirred at room temperature (~25°C.) for a period of 20 hours. After pouring the stirred reaction mass into 100 ml. of 3 N hydrochloric acid at 0°C., there was obtained a yellow precipitate which was subsequently collected by means of suction filtration, washed with cold water and dried. The latter material was then dissolved in hot boiling benzene, and the solution which formed was subsequently filtered while hot and allowed to cool to room temperature on standing. In this manner, there were obtained 2.39 g. (49%) of 2'-chloro-3,4-dihydro-2-methyl-3-oxo-2 H-1,2-benzothiazine-4-carboxanilide, 1,1-dioxide in the form of a crystalline deposit, melting at 139°–141°C.

Analysis.—Calcd. for $C_{16}H_{13}ClN_2O_4S$ (percent): C,52.67; H,3.59; N,7.68. Found (percent): C,52.91; H,3.68; N,7.77.

EXAMPLE VII

Substituted-3,4-Dihydro-3-Oxo-2H-1,2-Benzothiazine-4-Carboxanilide-1,1-Dioxide

The procedure described in Example I was repeated to prepare the following 3,4-dihydro-2-methyl-3-oxo-2H-1,2-benzothiazine-4-carboxamide 1,1-dioxides, starting from 3,4-dihydro-2-methyl-3-oxo-2H-1,2-benzothiazine 1,1-dioxide and the appropriate organic isocyanate reagent, and using triethylamine in place of sodium hydride (on the same molar basis) as catalyst, in each case:

3,4-dihydro-2-methyl-3-oxo-2H-1,2-benzothiazine-4-carboxanilide 1,1-dioxide, M.P. 154°–156°C.

4'-fluoro-3,4-dihydro-2-methyl-3-oxo-2H-1,2-benzothiazine-4-carboxanilide 1,1-dioxide, M.P. 149°–151°C.

4'-chloro-3,4-dihydro-2-methyl-3-oxo-2H-1,2-benzothiazine-4-carboxanilide 1,1-dioxide, M.P. 139°–141°C. (dec.)

3'-trifluoromethyl-3,4-dihydro-2-methyl-3-oxo-2H-1,2-benzothiazine-4-carboxanilide 1,1-dioxide, M.P. 130°–133°C.

4'-methyl-3,4-dihydro-2-methyl-3-oxo-2H-1,2-benzothiazine-4-carboxanilide 1,1-dioxide, M.P. 151°–153°C.

4'-methoxy-3,4-dihydro-2-methyl-3-oxo-2H-1,2-benzothiazine-4-carboxanilide 1,1-dioxide, M.P. 164°–167°C.

4'-nitro-3,4-dihydro-2-methyl-3-oxo-2H-1,2-benzothiazine-4-carboxanilide 1,1-dioxide, M.P. 198°–201°C.

3'-methyl-3,4-dihydro-2-methyl-3-oxo-2H-1,2-benzothiazine-4-carboxanilide 1,1-dioxide, M.P. 117°–120°C.

4'-ethoxy-3,4-dihydro-2-methyl-3-oxo-2H-1,2-benzothiazine-4-carboxanilide 1,1-dioxide, M.P. 159°–162°C.

3'-chloro-3,4-dihydro-2-methyl-3-oxo-2H-1,2-benzothiazine-4-carboxanilide 1,1-dioxide, M.P. 174°–177°C.

2'-methyl-3,4-dihydro-2-methyl-3-oxo-2H-1,2-benzothiazine-4-carboxanilide 1,1-dioxide, M.P. 162°–163°C.

2',5'-dichloro-3,4-dihydro-3-methyl-3-oxo-2H-1,2-benzothiazine-4-carboxanilide 1,1-dioxide, M.P. 183°–186°C.

2'-methoxy-3,4-dihydro-2-methyl-3-oxo-2H-1,2-benzothiazine-4-carboxanilide 1,1-dioxide, M.P. 157°–159°C.

3',4'-dichloro-3,4-dihydro-2-methyl-3-oxo-2H-1,2-benzothiazine-4-carboxanilide 1,1-dioxide, M.P. 215°–217°C.

2'-methyl-4'-nitro-2,4-dihydro-2-methyl-3-oxo-2H-1,2-benzothiazine-4-carboxanilide 1,1-dioxide, M.P. 206°–209°C.

4'-bromo-3,4-dihydro-3-oxo-2H-1,2-benzothiazine-4-carboxanilide-1,1-dioxide, M.P. 162°–165°C.

2',4'-dichloro-3,4-dihydro-3-oxo-2H-1,2-benzothiazine-4-carboxanilide-1,1-dioxide, M.P. 162°–165°C.

EXAMPLE VIII

Substituted-3,4-Dihydro-3-Oxo-2H-1,2-Benzothiazine-4-Carboxanilide-1,1-Dioxide.

The procedure described in Example I is employed once again, with triethylamine replacing sodium hydride as the catalyst (on the same molar basis and this time to prepare the following 4-carboxamide compounds, starting from the corresponding 3,4-dihydro-3-oxo-2H-1,2-benzothiazine 1,1-dioxide and the appropriate organic isocyanate reagent in each instance:

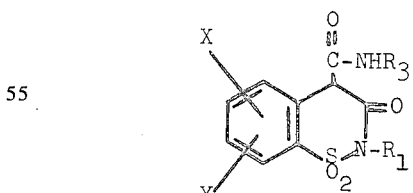

| X | Y | $R_3$ | $R_1$ |
|---|---|---|---|
| 5—$CH_3$ | H | phenyl | $C_6H_5(CH_2)_2$ |
| 6—$OCH_3$ | H | o-nitrophenyl | iso—$C_3H_7$ |
| H | 8—Cl | m-nitrophenyl | $C_2H_5$ |
| 5—Cl | H | p-nitrophenyl | methallyl |
| H | 7—$OCH_3$ | 2-chlorophenyl | iso—$C_5H_{11}$ |
| 6—Cl | 7—Cl | 3-chlorophenyl | n—$C_3H_7$ |
| 5—F | H | 4-chlorophenyl | $C_6H_5CH_2$ |
| 5—(n—$C_4H_9$) | H | 2-methylphenyl | methallyl |

—Continued

| X | Y | R₃ | R₁ |
|---|---|---|---|
| 6—OC₃H₅ | H | 3-methylphenyl | iso—C₃H₇ |
| H | 8—Cl | 4-methylphenyl | C₆H₅(CH₂)₂ |
| 6—Cl | H | 2-methoxyphenyl | C₂H₅ |
| 6—F | H | 4-methoxyphenyl | allyl |
| 6—CH₃ | 7—CH₃ | 2,5-dichlorophenyl | n—C₄H₉ |
| 6—OCH₃ | 7—OCH₃ | 3,4-dimethylphenyl | C₆H₅CH₂ |
| H | H | 3,4-dichlorophenyl | iso—C₄H₉ |
| H | 8—Cl | 4-(n-butyl)phenyl | CH₃ |
| H | H | 3-CF₃phenyl | methallyl |
| 5—CH₃ | H | 2,4-dimethoxyphenyl | C₂H₅ |
| H | 8—(n—C₄H₉) | 2,5-dimethoxyphenyl | C₆H₅CH₂ |
| H | H | 2-ethoxyphenyl | iso—C₃H₇ |
| 6—OC₅H₁₁(n) | 7—OC₅H₁₁(n) | 4-ethoxyphenyl | allyl |
| H | H | 3-isopropoxyphenyl | CH₃ |
| 6—F | 7—F | 4-bromophenyl | C₆H₅(CH₂)₂ |
| H | H | 4-fluorophenyl | n—C₃H₇ |
| 6—CF₃ | 7—CF₃ | 2,3-dichlorophenyl | C₆H₅CH₂ |
| 6—Cl | H | 5-Cl-2-methoxyphenyl | C₂H₅ |
| 6—Cl | 7—Cl | 3,5-dichlorophenyl | iso—C₄H₉ |
| 5—CF₃ | H | 3,5-dimethoxyphenyl | C₆H₅CH₂ |
| H | 7—OC₅H₁₁ | 2,6-dimethylphenyl | methallyl |
| 6—(n—C₅H₁₁) | 7—(n—C₅H₁₁) | 2-CH₃O-5-methylphenyl | CH₃ |
| H | 8—NO₂ | 2,4-dimethylphenyl | n—C₄H₉ |
| H | H | 3-Cl-4-methylphenyl | C₆H₅(CH₂)₂ |

EXAMPLE IX

N-(2-Thiazolyl)-3,4-Dihydro-2-Methyl-4-Oxo-2H-1,2-Benzothiazine-3-Carboxamide-1,1-Dioxide In a round-bottomed flask under nitrogen were placed xylene (10 ml.), 2′,5′-dichloro-3,4-dihydro-2-methyl-4-oxo-2H-1,2-benzothiazine-3-carboxanilide-1,1-dioxide (0.100 g. 0.25 moles) prepared by the method of Example II, 2-aminothiazole (0.030 g., 0.30 mmoles) which is available from Aldrich Chemical Company, No. 12,312-9 (97% pure) and a trace of p-toluenesulfonic acid. The 2-aminothiazole was recrystallized from benzene before it was used. The reaction mixture was refluxed and the extent of the reaction was measured by thin layer chromatography. After 3.5 hours, no change was observed in the chromatogram. After mixture was stirred over the weekend at room temperature, the chromatogram showed a spot which aligned with that of the desired product. 2-Aminothiazole (0.030 g., 0.30 mmoles) and another trace of p-toluenesulfonic acid were added and the reaction mixture stirred overnight at room temperature. The mixture was then refluxed overnight. After sixteen hours, 2-aminothiazole (0.030 g., 0.030 mmoles) was added and the reflux continued for eight hours. Then, more 2-aminothiazole (0.060 g., 0.60 mmoles) was added and the reflux continued overnight. The reaction mixture was then evaporated in vacuo to half-volume and cooled to about 0°C. whereupon a gummy brown precipitate formed. The mixture was evaporated to dryness and the solid residue dissolved in a minimum amount of boiling isopropanol, filtered and cooled to about 0°C. The precipitate which formed was separated by filtration and air dried to yield crude N-(2-thiazolyl)-3,4-dihydro-2-methyl-4-oxo-2H-1,2-benzothiazine-3-carboxamide-1,1-dioxide (0.046 g., 45%) M.P. 219°–257°. A further recrystallization from isopropanol afforded the pure product as a pale yellow solid (0.011 g., 13%) M.P. 244°–246° dec.

EXAMPLE X

N-(2-Thiazolyl)-3,4-Dihydro-2-Methyl-4-Oxo-2H-1,2-Benzothiazine-3-Carboxamide-1,1-Dioxide In a round-bottomed flask under nitrogen was placed xylene (10 ml.) 2′-chloro-3,4-dihydro-2-methyl-4-oxo-2H-1,2-benzothiazine-3-carboxanilide-1,1-dioxide (0.10 g., 0.27 mmoles) prepared by the method of Example III, 2-aminothiazole (0.041 g., 0.41 mmoles) and a trace of p-toluenesulfonic acid. The mixture was refluxed overnight and 2-aminothiazole (0.041 g., 0.41 mmoles) added again. After another overnight reflux, more 2-aminothiazole (0.081 g., 0.82 mmoles) and the mixture again refluxed overnight. The mixture was then cooled to about 0°C. and evaporated in vacuo to afford a gummy semi-solid which was dissolved in a minimum amount of boiling isopropanol. The mixture was filtered, cooled to about 0°C. and filtered again to separate the precipitate which formed. The air-dried solid residue (0.039 g.) M.P. 198°–202°C., was shown by thin layer chromatography to be about a 50% mixture of the title compound with starting material.

EXAMPLE XI

N-Substituted-3,4-dihydro-2-Methyl-4-Oxo-2H-1,2-Benzothiazine-3-Carboxanides-1,1-Dioxide The carboxanilides of Examples II, III and IV are reacted with amines of the structure R₂NH₂ in accordance with the methods of Examples IX and X to produce compounds of the structure

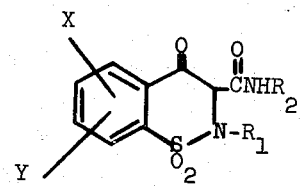

wherein R₂ is chosen from the group consisting of 2-pyridyl, 3-methyl-2-pyridyl, 4-methyl-2-pyridyl, 5-methyl-2-pyridyl, 6-methyl-2-pyridyl, 4,6-dimethyl-2-pyridyl, 5-chloro-2-pyridyl, 5-bromo-2-pyridyl, 5-nitro-2-pyridyl, 3-hydroxy-2-pyridyl, 5-carboxamido-2-pyridyl, 2-pyrazinyl, 2-pyrimidyl, 4,5-dimethyl-2-pyrimidyl, 4-pyrimidyl, 5-methyl-3-pyrazinyl, 6-methoxy-3-pyridazinyl, 1-phenyl-3-pyrazolonyl, 2-thiazolyl, 4-methyl-2-thiazolyl, 4-phenyl-2-thiazolyl, 5-bromo-2-thiazolyl, 4,5-dimethyl-2-thiazolyl, 3-isothiazolyl, 2-benzothiazolyl, 6-methyl-2-benzothiazolyl, 4-chloro-2-benzothiazolyl, 6-bromo-2-benzothiazolyl, 5-chloro-2-benzoxazolyl, 1,3,4-thiadiazolyl, 5-methyl-1,2,4-thiadiazolyl, 5-methyl-1,3,4-thiadiazolyl, 1,2,4-triazolyl and 6-phenyl-1,2,4-triazolyl.

EXAMPLE XII

N-Substituted-3,4-Dihydro-2-Methyl-3-Oxo-2H-1,2-Benzothiazine-4-Carboxamides-1,1-Dioxide The carboxanilides of Examples VI, VII and VIII are reacted with amines of the structure R₂NH₂ in accordance with the methods of Examples IX and X to produce compounds of the structure

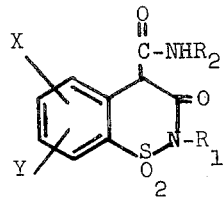

wherein R₂ is chosen from the group consisting of 2-pyridyl, 3-methyl-2-pyridyl, 4-methyl-2-pyridyl, 5-methyl-2-pyridyl, 6-methyl-2-pyridyl, 4,6-dimethyl-2-pyridyl, 5-chloro-2-pyridyl, 5-bromo-2-pyridyl, 5-nitro-2-pyridyl, 3-hydroxy-2-pyridyl, 5-carboxamido-2-pyridyl, 2-pyrazinyl, 2-pyrimidyl, 4,5-dimethyl-2-pyrimidyl, 4-pyrimidyl, 5-methyl-3-pyrazinyl, 6-methoxy-3-pyridazinyl, 1-phenyl-3-pyrazolonyl, 2-thiazolyl, 4-methyl-2-thiazolyl, 4-phenyl-2-thiazolyl, 5-bromo-2-thiazolyl, 4,5-dimethyl-2-thiazolyl, 3-isothiazolyl, 2-benzothiazolyl, 6-methyl-2-benzothiazolyl, 4-chloro-2-benzothiazolyl, 6-bromo-2-benzothiazolyl, 5-chloro-2-benzoxazolyl, 1,3,4-thiadiazolyl, 5-methyl-1,2,4-thiadiazolyl, 5-methyl-1,3,4-thiadiazolyl, 1,2,4-triazolyl and 6-phenyl-1,2,4-triazolyl.

What is claimed is:

1. A process for preparing a 3,4-dihydro-2H-1,2-benzothiazine 1,1-dioxide of the formula:

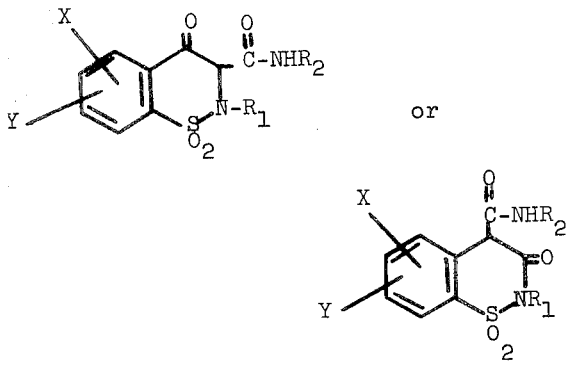

wherein X and Y each are selected from the group consisting of hydrogen, fluorine, chlorine, bromine, nitro, trifluoromethyl, and alkyl and alkoxy of up to five carbon atoms;

$R_1$ is a member selected from the group consisting of hydrogen, lower alkyl and alkenyl of up to four carbon atoms and phenyl alkyl of up to three carbon atoms in the alkyl moiety, and $R_2$ is a member selected from the group consisting of 2-pyridyl, 3-methyl-2-pyridyl, 4-methyl-2-pyridyl, 5-methyl-2-pyridyl, 6-methyl-2-pyridyl, 4,6-dimethyl-2-pyridyl, 5-chloro-2-pyridyl, 5-bromo-2-pyridyl, 5-nitro-2-pyridyl, 3-hydroxy-2-pyridyl, 5-carboxamido-2-pyridyl, 2-pyrazinyl, 2-pyrimidyl, 4,5-dimethyl-2-pyrimidyl, 4-pyrimidyl, 5-methyl-3-pyrazinyl, 6-methoxy-3-pyridazinyl, 1-phenyl-3-pyrazolonyl, 2-thiazolyl, 4-methyl-2-thiazolyl, 4-phenyl-2-thiazolyl, 5-bromo-2-thiazolyl, 4,5-dimethyl-2-thiazolyl, 3-isothiazolyl, 2-benzothiazolyl, 6-methyl-2-benzothiazolyl, 4-chloro-2-benzothiazolyl, 6-bromo-2-benzothiazolyl, 5-chloro-2-benzoxazolyl, 1,3,4-thiadiazolyl, 5-methyl-1,2,4-thiadiazolyl, 5-methyl-1,3,4-thiadiazolyl, 1,2,4-triazolyl and 6-phenyl-1,2,4-triazolyl;

which comprises contacting a corresponding carboxanilide compound of the formulae:

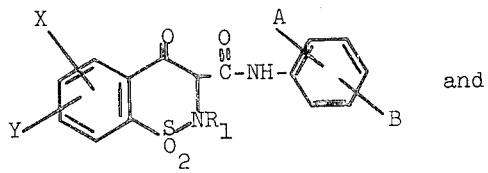 and

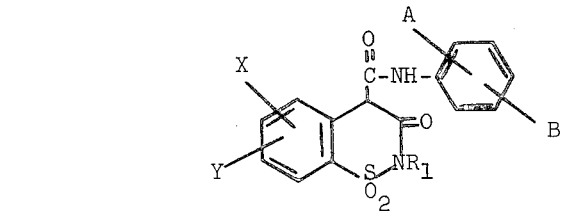

wherein A and B are each selected from the group consisting of hydrogen, fluorine, chlorine, bromine, nitro, trifluoromethyl and alkyl and alkoxy of up to three carbon atoms, with at least a substantially equimolar portion of an amine of the formula $R_2NH_2$ wherein $R_2$ is as previously defined in reaction-inert organic solvent medium at a temperature between about 75°C. and about 200°C. until the reaction is substantially complete.

2. The process of claim 1 wherein A is other than hydrogen and is located at the ortho position of the phenyl ring.

3. The process of claim 2 wherein A is chlorine.

4. The process of claim 2 wherein A is methoxy.

5. The process of claim 3 wherein B is 5-chloro.

6. The process of claim 2 wherein said starting material is a 3-carboxanilide and X and Y are each hydrogen and $R_1$ is methyl.

7. The process of claim 6 wherein $R_2$ is 2-thiazolyl.

8. The process of claim 6 wherein $R_2$ is 2-pyridyl.

9. The process of claim 6 wherein A is 2-chloro and B is 5-chloro.

10. The process of claim 6 wherein A is 2-methoxy and B is 5-methoxy.

* * * * *